United States Patent
Stevenson et al.

(10) Patent No.: US 6,802,682 B2
(45) Date of Patent: Oct. 12, 2004

(54) SPIRALED SELF-PIERCING RIVET

(75) Inventors: Robin Stevenson, Bloomfield, MI (US); Pei-Chung Wang, Troy, MI (US)

(73) Assignee: General Motors Corporation, Detroit, MI (US)

(*) Notice: Subject to any disclaimer, the term of this patent is extended or adjusted under 35 U.S.C. 154(b) by 52 days.

(21) Appl. No.: 10/298,720

(22) Filed: Nov. 18, 2002

(65) Prior Publication Data

US 2004/0096295 A1 May 20, 2004

(51) Int. Cl.⁷ .................... F16B 19/08; F16B 37/04
(52) U.S. Cl. ................. 411/501; 411/179; 411/453; 29/525.06
(58) Field of Search ................. 411/179, 180, 411/181, 500, 501, 453, 448; 29/525.05, 525.06

(56) References Cited

U.S. PATENT DOCUMENTS

| | | | |
|---|---|---|---|
| 4,650,373 A | | 3/1987 | Seegmiller |
| 5,207,588 A | | 5/1993 | Ladouceur et al. |
| 5,564,873 A | | 10/1996 | Ladouceur et al. |
| 5,575,601 A | * | 11/1996 | Skufca et al. ........... 411/453 X |
| 5,613,815 A | * | 3/1997 | Muller ................... 411/179 X |
| 6,325,584 B1 | * | 12/2001 | Marko et al. ................ 411/179 |

* cited by examiner

*Primary Examiner*—Neill Wilson
(74) *Attorney, Agent, or Firm*—Kathryn A. Marra

(57) ABSTRACT

The present invention is a self-piercing rivet wherein the hollow shell has an external spiraling, wherein the spiraling is with respect to the axis of rotation of the hollow shell. Once installed in a stack of sheets, the spiraling prevents the riveted sheets from mutually separating and the rivet loosening with respect to the sheets.

7 Claims, 3 Drawing Sheets

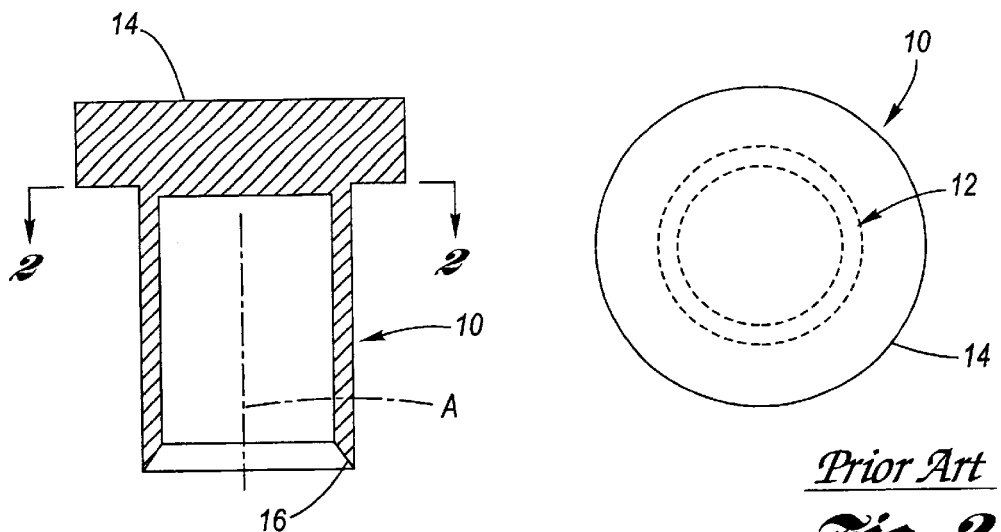
*Prior Art*
*Fig. 1*
*Prior Art*
*Fig. 2*
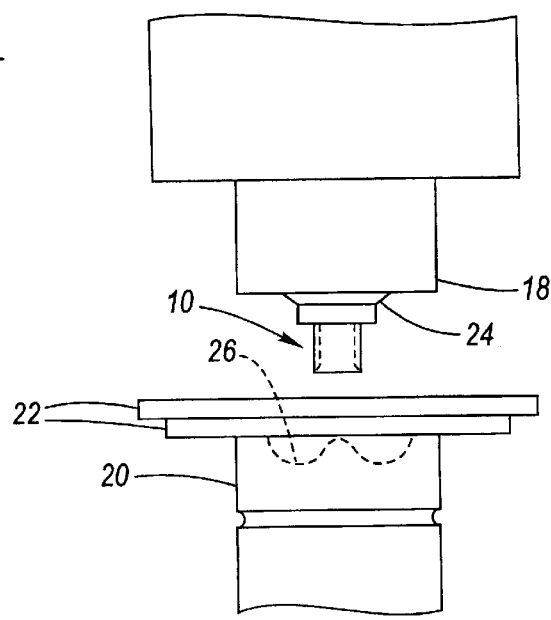
*Prior Art*
*Fig. 3*
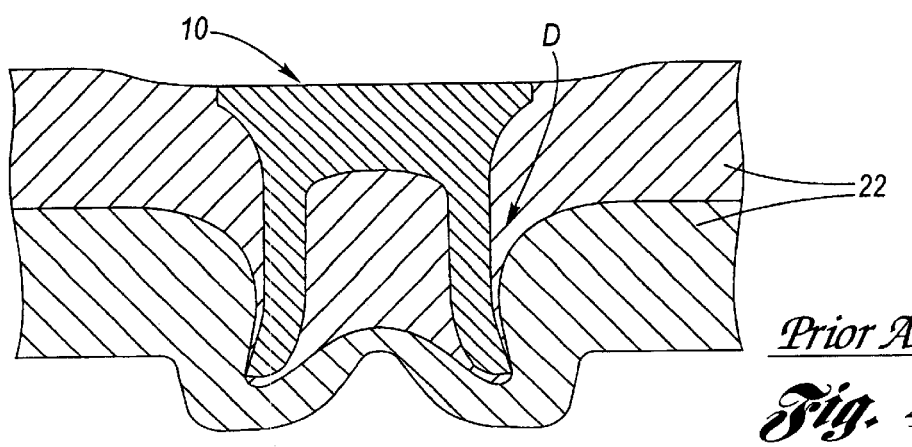
*Prior Art*
*Fig. 4*

SPIRALED SELF-PIERCING RIVET

TECHNICAL FIELD

The present invention relates to self-piercing rivets used to join together metallic sheets, and more particularly to a self-piercing rivet having spiraling which resists pull-out of the rivet with respect to metallic sheets joined thereby.

BACKGROUND OF THE INVENTION

The joining of metallic sheets can be accomplished by various mechanical modalities, as for example, threaded fasteners, rivets and welding. The modality used depends upon the application. One type of rivet having an excellent ability to join together a stack of metallic sheets is a self-piercing rivet.

Various aspects of a prior art self-piercing rivet are shown at FIGS. 1 through 4. A self-piercing rivet 10 has a hollow shell 12 of cylindrical shape which is closed at one end by an overhanging head 14 and which has at the opposite end a point 16. A ram 18 and opposing die 20 are used to drive the self-piercing rivet 10, point 16 first, into two or more sheets 22, typically a metal, such as for example aluminum. The ram 18 has a convex contour 24 and the die has a concave contour 26, such that after stroking of the ram, the hollow shell 12 pierces the sheets 22 with a deformation D defined by the concave contour 26 and wherein the head 14 is countersunk by the convex contour 24. The deformation D involves a bending of the hollow shell 12 outwardly so as to lock the self-piercing rivet 10 in position with respect to the sheets 22 such as to prevent its removal from the sheets and, as a result, any possible disjoinder of the sheets.

It will be noticed that the deformation D prevents the self-piercing rivet 10 and the sheets 22 from releasing from one another under normal loading conditions. However, there is yet the possibility that under certain loading conditions the self-piercing rivet could be loosened from the sheets, in which case the sheets may then become mutually spaced apart or even separated from each other.

Accordingly, what is needed in the art is some way to prevent loosening of sheets mutually attached by a self-piercing rivet.

SUMMARY OF THE INVENTION

The present invention is a self-piercing rivet wherein the hollow shell thereof has an external spiral feature, wherein the spirals thereof constitute external surface features (intrusive or protrusive) which twist (or turn) about the axis of rotation of the hollow shell (or simply put, the shell axis) from generally between the head and the point. Since forces which will tend to loosen the rivet and separate the sheets must have a component parallel to the shell axis of the rivet, once the spiraled self-piercing rivet has been installed in a stack of sheets, the rivet is prevented from being loosened from the sheets because the spirals of the spiral feature resist interferingly (with respect to the sheets) any component of force which is parallel to the shell axis.

A preferred external spiral feature is provided by the exterior surface of the hollow shell having a cornered geometry (for example, a square, a hexagon, an octagon, etc.), wherein the corners are twisted about the shell axis from the head to the point. The pitch of the twist is preferably coarse; for example, between about one-quarter turn to about one or two turns over the length of the hollow shell.

In another preferred external spiral feature, irregular surface features extend twistingly generally between the head and the point. The irregular surface features may be either protruding surface features, such as for example ribs, or intruding surface strutures, such as for example flutes (i.e., grooves or slots).

In operation, as the spiraled self-piercing rivet is driven into a plurality of sheets (composed of for example, metal or metal composite) to be joined, the spiral features interact with the sheets such that after joinder, the sheets are prevented from mutual separation because the component of applied forces which is parallel to the shell axis is resisted by an interference relationship between the spiral features and the stack of sheets.

Accordingly, it is an object of the present invention to provide a self-piercing rivet having a spiral feature which serves to resist loosening of the rivet with respect to the sheets joined thereby.

This and additional objects, features and advantages of the present invention will become clearer from the following specification of a preferred embodiment.

BRIEF DESCRIPTION OF THE DRAWINGS

FIG. 1 is a sectional side view of a prior art self-piercing rivet.

FIG. 2 is a top end view of the self-piercing rivet, seen along line 2—2 of FIG. 1.

FIG. 3 is a schematic side view of a prior art ram and die mechanism, shown operative with respect to a prior art self-piercing rivet and a stack of sheets to be riveted.

FIG. 4 is a sectional side view of the stack of sheets and prior art self-piercing rivet of FIG. 3, showing the rivet joinder created after the ram has stroked.

DESCRIPTION OF THE PREFERRED EMBODIMENT

Figure 5:
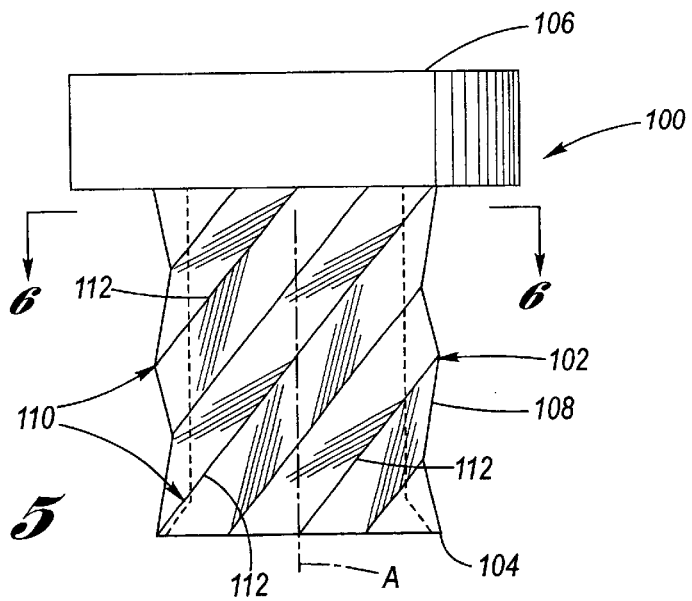
FIG. 5 is a side view of a spiraled self-piercing rivet according to the present invention, wherein the spiraling is provided by a plurality of twisted corners on the external surface of the hollow shell.
Figure 6:
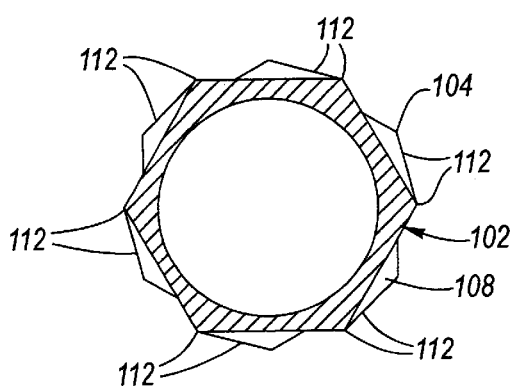
FIG. 6 is a sectional view of the axially asymmetric self-piercing rivet, seen along line 6—6 of FIG. 5.
Figure 8:
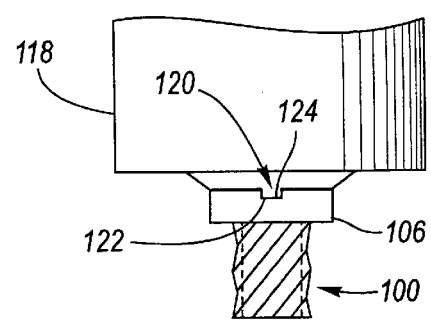
FIG. 8 is a schematic side view of a ram operatively interfaced with the spiraled self-piercing rivet of FIG. 5.

Referring now to the Drawing, FIGS. 5 through 13 depict various aspects and examples of a spiraled self-piercing rivet according to the present invention.

Referring firstly to FIGS. 5 through 8, a first preferred spiraled self-piercing rivet 100 is depicted. The hollow cylinder 102 has an axis of rotation A' and terminates at one end in a point 104 and at the opposite end is connected to a head 106 which is oriented transversely with respect to the shell axis A'. The head 106 has a larger diameter than that of the hollow cylinder such that it overhangs the hollow cylinder.

A spiral feature 110 of the hollow shell 102 is provided by the exterior surface 108 thereof having a plurality of corners 112 which twist (or turn) to form spirals about the shell axis A' between the head 106 and the point 104. The number of corners is preferably related to that of a symmetrically balanced geometrical object having corners, such as a square (having 4 corners) or a hexagon (having 6 corners), wherein the number of corners may be other than those exemplified. The corners 112 may be radiused to "soften" the right-angularity of the corners so as to inhibit nonuniform stretch of the rivet during inserting and risk of rivet splitting.

Figure 7:
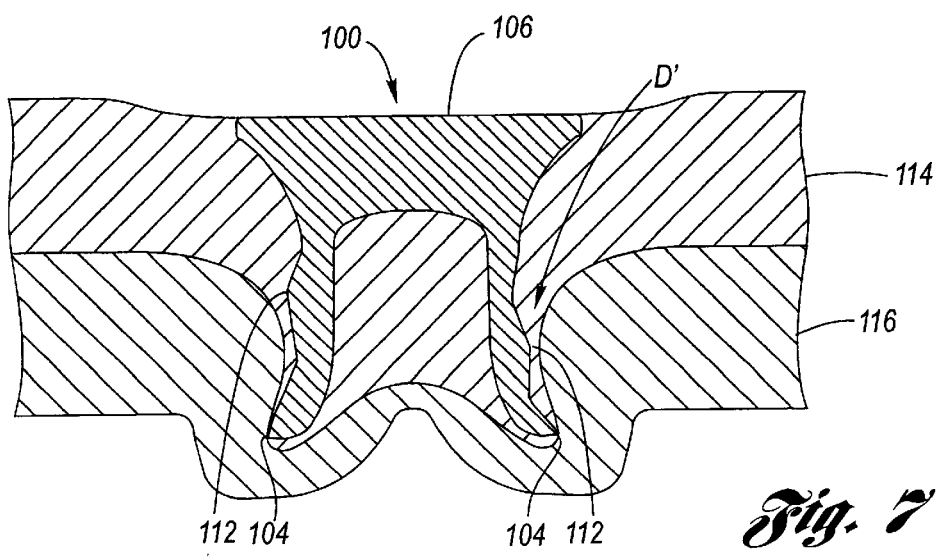
FIG. 7 is a sectional side view of a stack of sheets and the spiraled self-piercing rivet of FIG. 5, showing the rivet joinder thereby created.

In operation, the spiraled self-piercing rivet 100 is placed at the ram of a ram and die mechanism as generally depicted at FIG. 3, and sheets of metal (i.e., aluminum, another metal, or metal composite) 114, 116 are stacked at the die and the ram is then stroked. FIG. 7 depicts an example of the deformation D' resulting from the ram and die mechanism driving the asymmetric self-piercing rivet into the sheets. As can be discerned by this exemplification, the corners 112 now provide an interference location with respect to at least one of the sheets which resists any force component applied to the sheets in a direction parallel to the shell axis A' which would tend to loosen the rivet with respect to the sheets.

In order to ensure a tight, clamping fit between the spiral feature (spirals) 110 of the spiraled self-piercing rivet and the sheets where the sheets are non-resilient, as in the case of aluminum sheet, it is desirable to include a drive interface 120 between the rivet and the ram so that the ram turns the rivet at a rate of rotation consonant with the penetration speed of the rivet into the sheets and the pitch of the spiral features. For example, the drive interface 120 may be in the form of the ram having a driver 122 which interfaces with a slot 124 in the head 106 to thereby rotate the rivet. A load cell, other sensor, or the mechanical function of the movement of the ram relative to the die can be used to synchronize the rotation rate of the rivet with respect to the speed of insertion of the rivet.

Alternative to corners 112, the spiral feature may be in the form of irregular surface features 110' which extend spirally (twistingly) generally between the head and the point. The irregular surface features 110', as shown at FIGS. 9 through 13, may be either intruding surface features 112', such as for example a plurality of flutes, or protruding surface structures 112", such as for example a plurality of ribs.

Figures 9, 10:
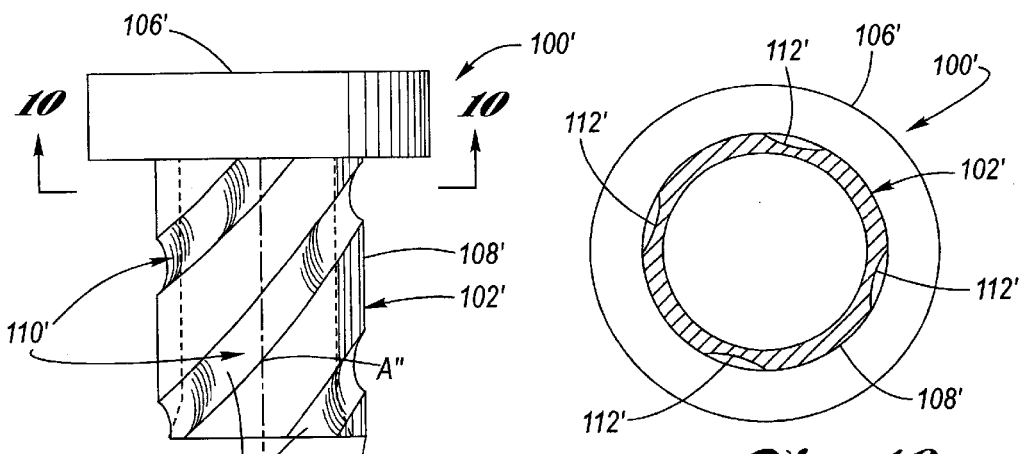
FIG. 9 is a side view of a second preferred spiraled self-piercing rivet according to the present invention, wherein the spiral feature is provided by a plurality of twisted flutes.
FIG. 10 is a partly sectional view of the spiraled self-piercing rivet, seen along line 10—10 of FIG. 9.
Figure 11:
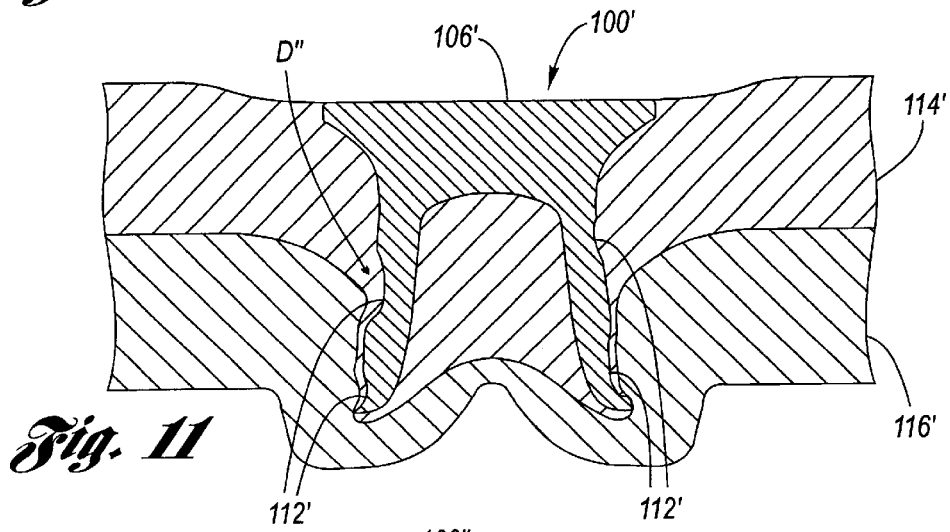
FIG. 11 is a sectional side view of a stack of sheets and the spiraled self-piercing rivet of FIG. 9, showing the rivet joinder thereby created.

As shown firstly at FIGS. 9 through 11, the second preferred spiraled self-piercing rivet 100' has intruding surface features (i.e., flutes, slots or grooves) 112', which may be of any shape, preferably circularly concave. By way of example, there may be four flutes equally spaced apart circumferentially around the exterior surface 108', having for example, between one-quarter and two turns over the length of the hollow shell 102'.

In operation, the spiraled self-piercing rivet 100' is placed at the ram of a ram and die mechanism as generally depicted at FIG. 3, and sheets of metal (i.e., aluminum, another metal, or metal to composite) 114', 116' are stacked at the die and the ram is then stroked. FIG. 11 depicts an example of the deformation D" resulting from the ram and die mechanism driving the asymmetric self-piercing rivet into the sheets. As can be discerned by this exemplification, at least one of the sheets intrudes radially inward with respect to the exterior surface 108' into the flutes 112'. As a result, an interference fit between the sheets and the spiraled self-piercing rivet is established which prevents forces acting parallel to the shell axis from loosening the sheets relative to the rivet, as well as relative separation of the sheets.

Figures 12, 13:
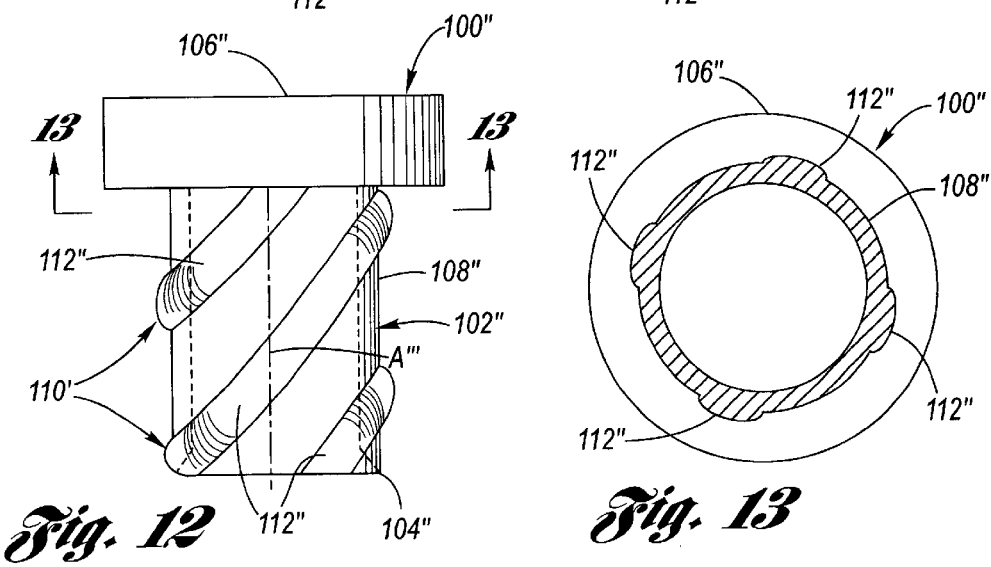
FIG. 12 is a side view of a third preferred spiraled self-piercing rivet according to the present invention, wherein the spiral feature is provided by a plurality, of twisted ribs.
FIG. 13 is a partly sectional view of the spiraled self-piercing rivet, seen along line 13—13 of FIG. 12.

Referring finally to FIGS. 12 and 13, a third preferred axially asymmetric self-piercing rivet 100" is depicted. As in FIG. 9, the hollow cylinder 102" has an axis of rotation A'" and terminates at one end in a point 104" and is connected to a head 106" which is transversely oriented relative to the axis A'". The head 106" has a larger diameter than that of the hollow cylinder such that it overhangs the hollow cylinder.

The second preferred spiraled self-piercing rivet 100" has protruding surface features (i.e., ribs) 112", which may be of any shape, preferably circularly convex. By way of non-limiting example, there may be four ribs equally spaced apart circumferentially around the exterior surface 108", having for example, between one-quarter and two turns over the length of the hollow shell 102".

In operation, the spiraled self-piercing rivet 100" is placed at the ram of a ram and die mechanism as generally depicted at FIG. 3, and sheets of metal (i.e., aluminum, another metal, or metal to composite) are stacked at the die and the ram is then stroked. The deformation resulting from the ram and die mechanism driving the asymmetric self-piercing rivet into the sheets is similar to that shown at FIG. 11 except that now each sheet has respective portions which are invaded by the ribs 112" in a direction which is radially outward with respect to the exterior surface 108". As a result, an interference fit between the sheets and the spiraled self-piercing rivet is established which prevents loosening of the rivet and relative separation of the sheets.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A spiraled self-piercing rivet, comprising:

a hollow shell having an axis of rotation, said hollow shell having a first end and an opposite second end, a sharp edge being located at said first end, said hollow shell having an exterior surface, said external surface having a spiral feature formed thereon; and a head connected with said second end of said hollow shell at a transverse relation with respect to said axis.

2. The rivet of claim 1, wherein said spiral feature comprises a plurality of spirals which twist with respect to said axis substantially between said first and second ends.

3. The rivet of claim 2, wherein said plurality of spirals comprises a plurality of ribs, the ribs of said plurality of ribs being mutually spaced apart around said external surface of said hollow shell.

4. The rivet of claim 2, wherein said plurality of spirals comprises a plurality of flutes, the flutes of said plurality of flutes being mutually spaced apart around said external surface of said hollow shell.

5. The rivet of claim 1, wherein said spiral feature comprises a cornered geometrical shape of said external surface extending substantially between said first and second ends, wherein the corners thereof comprise a plurality of spirals twisting with respect to said axis.

6. A method for riveting a plurality of sheets together, said method comprising the steps of:

forcing a spiraled rivet deformationally into a stack of sheets in a direction parallel to a shell axis of the rivet;

wherein the spiraling survives the deformation sufficiently that each sheet of the stack of sheets is prevented from loosening parallel to the shell axis by an interference between the sheets and the survived spirals of the rivet.

7. The method of claim 6, further comprising rotating the rivet consonant with a pitch of the spiraling of the rivet and the rate at which the rivet is forced into the sheets so that the spirals tightly engage at least one of the sheets.

* * * * *